Fig. 1.

IMPLEMENTATION EQUATION DIAGRAM.

Fig. 2A.

MATRIX COMPUTER

United States Patent Office 3,412,239
Patented Nov. 19, 1968

3,412,239
ALGEBRAIC-INTEGRATION INERTIAL NAVIGATION SYSTEM
Victor H. Seliger, North Caldwell, N.J., and Henry Blazek, Nyack, Joseph Levine, North Bellmore, Alvin Zechnowitz, Howard Beach, and Joseph Stahl, Queens Village, N.Y., assignors to Sperry Rand Corporation, Ford Instrument Company Division, Long Island City, N.Y., a corporation of Delaware
Filed Jan. 22, 1963, Ser. No. 253,531
8 Claims. (Cl. 235—150.25)

This invention relates to inertial navigation computing systems and particularly to those systems employing sensors which are "strapped down" to the vehicle in which they are disposed and, hence, not mounted on stabilized platforms.

The inertial navigation system which embodies the present invention computes the navigation parameters simply and without error due to motion of the vehicle. These parameters afford an indication of vehicle position, velocity and attitude under all conditions of vehicle position and motion. The computations are made in the inertial frame in which the solution varies at a relatively low rate. Previous navigation systems have either made the navigation computation in a nondynamically exact manner so that the indicated output contained errors resulting from vehicle motion or else have determined some of the necessary parameters in a complicated and implicit manner.

The invention combines a set of sensors (inertial, Doppler radar and altimeter) with a special purpose digital computer, in order to provide an inertial navigation system which computes the various navigation parameters simply and without error due to motion of the vehicle. The computer has been designed specifically for use with a set of components, 3 rate integral gyros, 3 accelerometers, a three axis Doppler radar system, and an altimeter, which are "strapped down", that is mounted directly to the body of the vehicle in which they are disposed and without the use of a stabilized platform. However, the computer may readily be adapted to a stabilized platform configuration of inertial sensors. The digital computer utilizes basic building blocks well known in the industry, combined in specialized and unique manner for the solution of a set of explicit equations relating to various navigation parameters.

There follows a detailed description of the inertial navigation system, the description being taken in conjunction with the accompanying drawings, in which.

Figure 1:
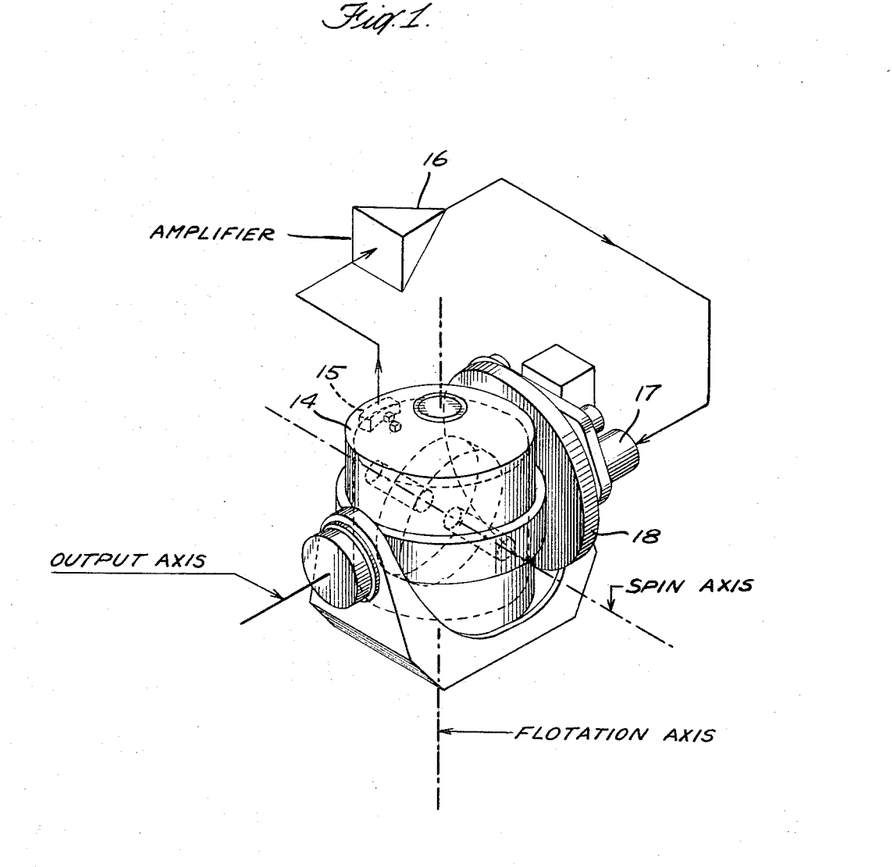
FIG. 1 shows a rate integral gyro and output transducer.

The sensors for the system provide its inputs and include an altimeter 10, three orthogonally mounted rate integral gyros in box 11, three orthogonally mounted accelerometers in box 12 and a radar Doppler 13, each of the rate integral gyros consisting of a rate integrating gyro, as shown in FIG. 1, mounted in a gimbal having its axis along the rate integrating gyro input axis, and having a servo adapted to provide stabilization about the input axis. Inductive pickoff 15 measures rotation of the inner cylinder of the rate integrating gyro with respect to its outer cylinder about the flotation axis, providing servo error signals via servo loop amplifier 16 to torque motor 17 to effect stabilization about the input axis. The output of the rate integral gyro, provided by the digital encoder 18, is a train of pulses representing incremental angular rotations of the servoed gimbal with respect to the base. Since the base of the gyro is rigidly fixed to the frame of the vehicle, the output of the gyro is a pulse rate proportional to the angular velocity of the vehicle about the gimbal axis or measuring axis of the gyro.

Each of the three accelerometers is rigidly fixed to the frame of the vehicle so that it indicates the acceleration along an axis parallel to one of the rate integral gyro measuring axes. The accelerometers are provided with digital transducers which provide pulse rates proportional to acceleration along the accelerometer measuring axes.

The radar Doppler 13 is rigidly mounted to the frame of the vehicle so that it indicates the components of vehicle ground velocity along axes parallel to the measuring axes of the rate integral gyros. Its output has three channels each of which provides a pulse rate proportional to the component of ground velocity along one of the three measuring axes of the rate integral gyros.

The altimeter 10 provides a whole number digital output representing altitude above sea level.

Figure 2:
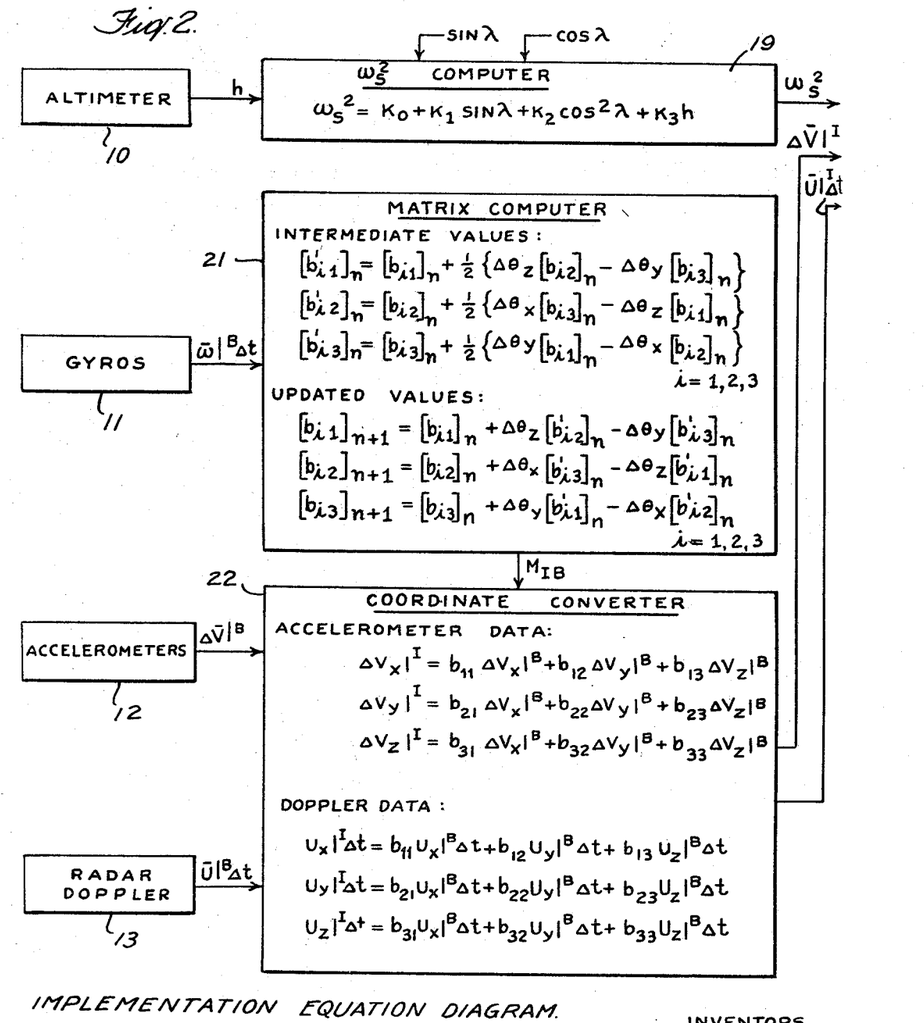
FIGS. 2, 2A and 2B are block diagrams showing the inertial navigation system.
Figure 2A:
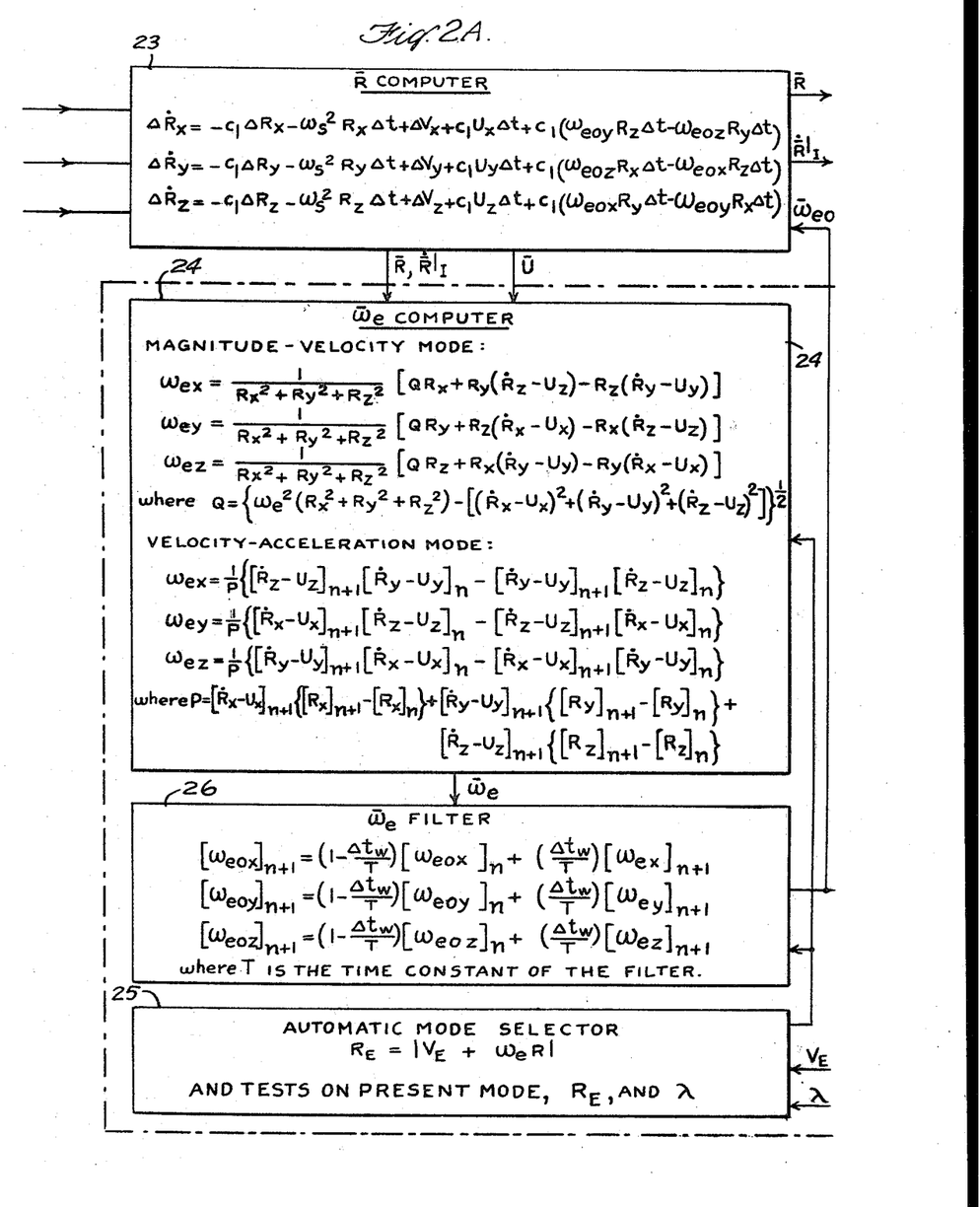
Figure 2B:
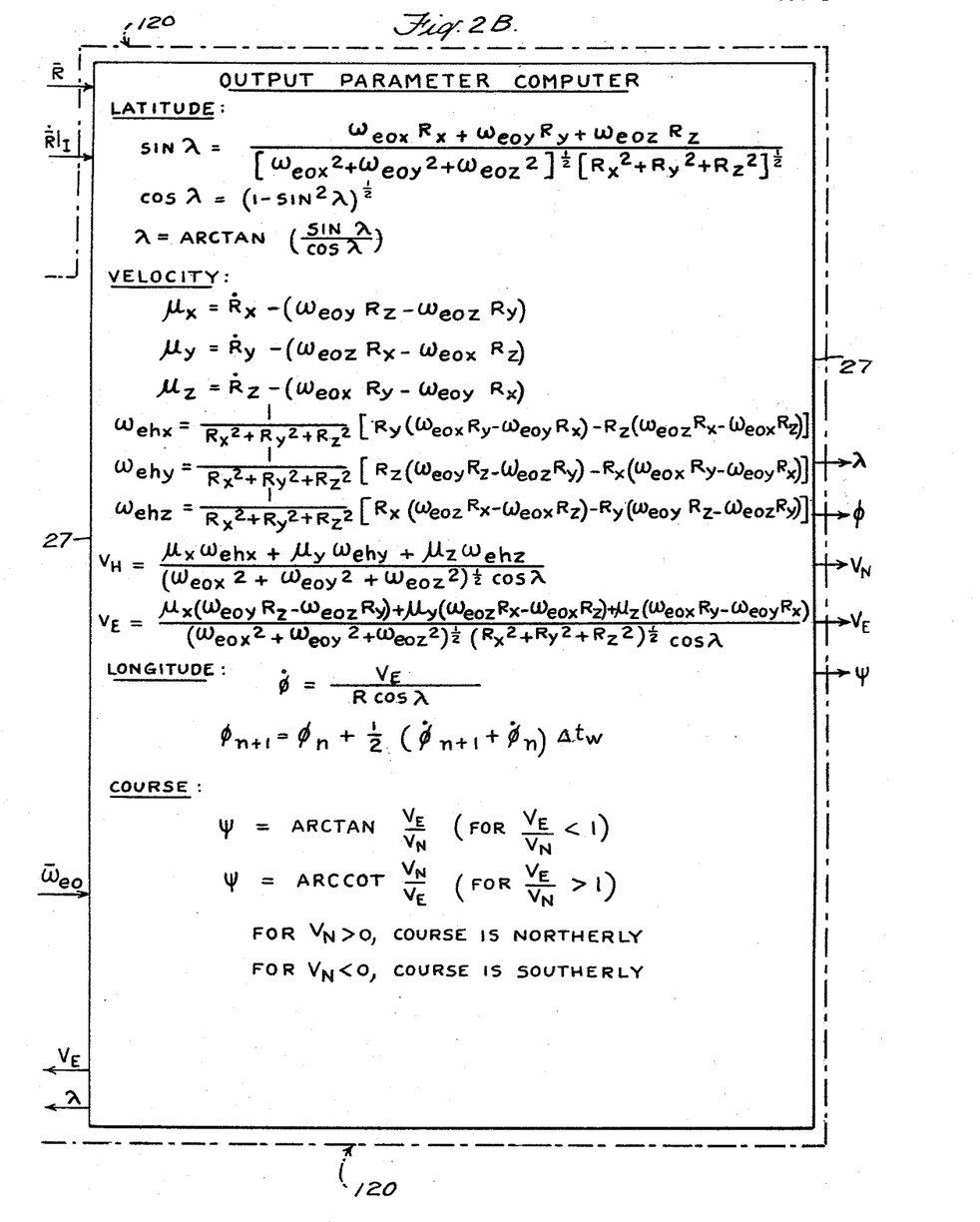

As shown in FIG. 2, the gyros provide the three components of the vehicle's incremental angular rotations about the three measuring axes, $\omega_x \Delta t$, $\omega_y \Delta t$ and $\omega_z \Delta t$, to matrix computer 21 which derives therefrom the directions cosines which are used subsequently to convert the accelerometer and radar Doppler output components from the body or vehicle system to the inertial system. The computer 21 computes intermediate values of the direction cosines $[b'_{11}]_n$, $[b'_{12}]_n$, and $[b'_{13}]_n$ where $i$ equals 1, 2 and 3. The equations for these computations are indicated in box 21 and in the equations $\Delta\theta_j$ is $\omega_j \Delta t$. The same elements in the computer then compute updated values for the direction cosines having the notations $[b_{11}]_{n+1}$, $[b_{12}]_{n+1}$, and $[b_{13}]_{n+1}$. The updated values of the direction cosines are calculated according to the equations which are also shown in box 21. The direction cosines derived in the matrix computer indicated by the symbol $M_{IB}$ are placed in the coordinate converter 22 which uses the direction cosines to transform the velocity and radar Doppler data obtained from the accelerometers and radar Doppler respectively, from the body system to the inertial system according to the equations shown in box 22.

The system includes a whole number computer which inter alia computes latitude $\lambda$ of the vehicle. Latitude information in the form of $\sin \lambda$ and $\cos \lambda$ is placed in the Schuler frequency computer 19. This section of the computer calculates $\omega_s^2$ according to the equation shown in the block diagram. The $\overline{R}$ computer 23 employs the quantities $\omega_s^2$ and the transformed accelerometer and radar Doppler velocity components indicated by the symbols $\Delta \overline{V}|^I$ and $\overline{U}|^I \Delta t$ to compute the $x$, $y$ and $z$ position components of the vehicle with respect to the center of the earth, indicated by the notation $\overline{R}$ and their derivatives $\dot{\overline{R}}|_I$ and the three Doppler components indicated by the symbol $\overline{U}$. These quantities are placed in computer 24 which determines the $x$, $y$ and $z$ components of the earth's angular velocity. The computer 24 is designated the $\varpi_e$ computer and makes computations of earth's angular velocity components in either the magnitude-velocity mode or the velocity-acceleration mode according to the output of automatic mode selector 25. The earth's angular velocity components represented by the symbol $\varpi_e$ are then placed in $\varpi_e$ filter 26 which smooths and updates the vectorial components which are represented by the notations $[\omega_{eox}]_{n+1}$, $[\omega_{eoy}]_{n+1}$, and $[\omega_{eoz}]_{n+1}$.

Output parameter computer 27 employs as inputs the smoothed components of earth's angular velocity indicated by the symbol $\varpi_{eo}$, and the position components derived in the $\overline{R}$ computer namely $R_x$, $R_y$ and $R_z$ collectively indicated by the symbol $\overline{R}$ and their derivatives $\dot{R}_x$, $\dot{R}_y$ and $\dot{R}_z$ which are collectively indicated by the symbol $\bar{\dot{R}}|_I$. The computer 27 serves to calculate the vehicle's latitude $\lambda$, its longitude $\phi$, its northerly velocity component $V_N$, its easterly velocity component $V_E$, and its course $\psi$ according to the equations shown in box 27 in the block diagram of FIG. 2.

The matrix computer continuously updates the nine $b_{ij}$ elements of the B-matrix, each element once during every iteration. The updating of each $b_{ij}$ element is a two-part process wherein first the intermediate quantity $b'_{ij}$ is computed followed by the computation of the updated $b_{ij}$. The required computations are made using a rapid, special purpose device as described below, taking only 1 millisecond for a complete updating iteration.

The three $b_{ij}$ elements of a single colume of the B-matrix are stored in a six-word recirculating register (on a magnetic memory drum) along with the three $b'_{ij}$ elements as follows:

| $b_{31}$ | $b_{21}$ | $b_{11}$ | $b'_{31}$ | $b'_{21}$ | $b'_{11}$ |

Each $b_{ij}$ word is composed of 48 bits in order to meet the required accuracy. The formation of the intermediate quantity $b'_{ij}$ required the addition and subtraction of terms of the form ½ $b_{12} \Delta\theta_z$ with $b_{ij}$ terms. For simplified multiplication, the $\Delta\theta_z$ quantity, received from the z axis gyro, is used in the form of a scaled pulse to gate the stored $b_{ij}$ element. The scaling of the $\Delta\theta_z$ pulse is adjusted so that, for the maximum vehicle rotation rate, not more than one $\Delta\theta_z$ pulse will occur during a single iteration of the matrix computer. The corresponding scaling of the $b_{ij}$ quantity ($2^{-11}$) and the ½ factor together require a $2^{-12}$ scale factor which is achieved by reading out the $b_{ij}$ term for the product from the recirculating register 12 bits earlier than the $b_{ij}$ term to be added. Thus, utilizing three recirculating registers (each containing the elements of a single column of the $M_{IB}$ matrix), the three old $b_{ij}$ elements of a single row of the $M_{IB}$ matrix are read out simultaneously, gated by the proper $\Delta\theta_z$ pulses, and combined with the proper old values of $b_{ij}$ using one adder and one subtracter for each column. The newly formed $b'_{ij}$ terms are then stored in the correct column recirculating registers. The same process is repeated for each of the three rows of the $M_{IB}$ matrix until each six-word register contains both the set of three old $b_{ij}$ values and the three newly formed $b'_{ij}$ terms of one column.

The second part of the updating process now begins and, since the equation for $b'_{ij}$ and $b_{ij}$ are almost identical, the process is almost identical, using the same $\Delta\theta_{(j+1)}$ gating signals and the same adders and subtracters. The differences between the two parts of the computation are the following: a one bit delay is used in forming the product terms $b'_{ij}\Delta\theta_{(j+1)}$ in order to change the $b'_{ij}$ scale factor from $2^{-12}$ to $2^{-11}$ to account for the absence of the ½ factor. The $b'_{ij}$ terms are used for the product terms rather than the $b_{ij}$ terms. The $b_{ij}$ terms are read out from the end of each register rather than from the middle (this is because the three old values of $b_{ij}$ have shifted from the one position to the other during the first part of the updating process).

As each new value of $b_{ij}$ is formed, it is also stored in its proper location in one of the six-word recirculating registers to be used for future computations.

Figure 3:
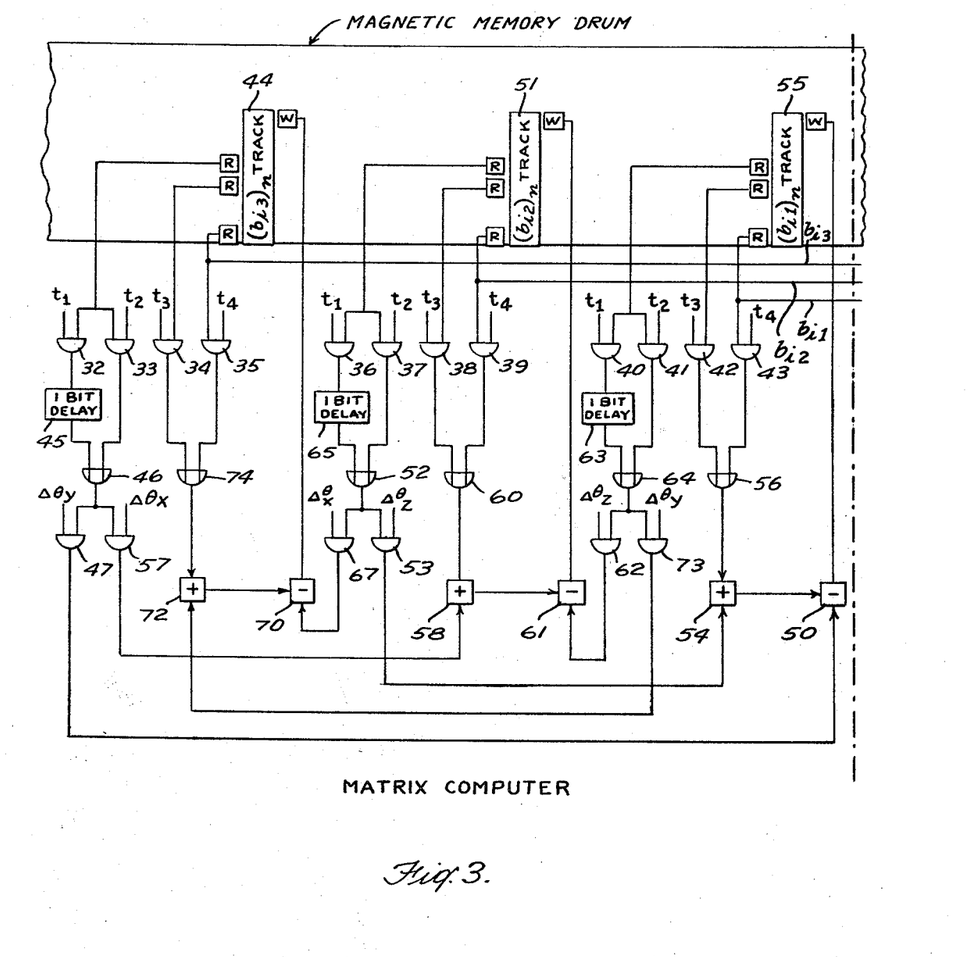
FIGS. 3, 3A and 3B show the schematic circuit of the system.
Figure 3A:
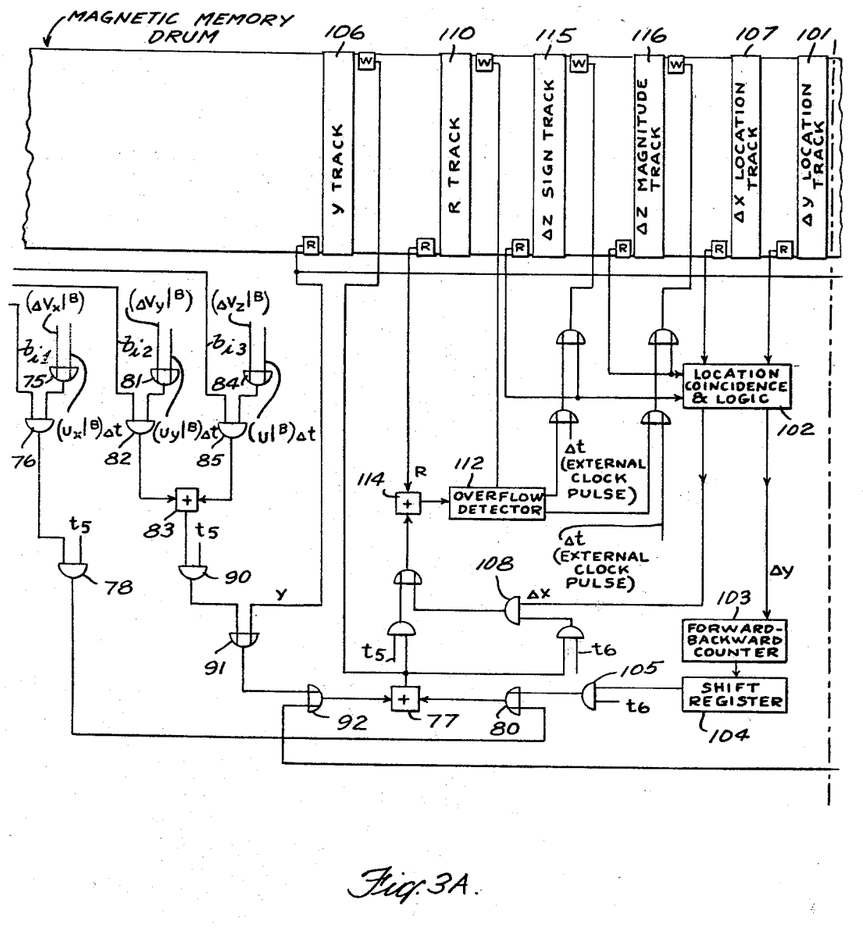

In FIGURE 3, the simplified logic and the timing signals required for the above process are shown. Not shown is the synchronization of $\Delta\theta_{(j+1)}$ pulses to machine timing. The $\Delta\theta_{(j+1)}$ pulses, arriving at random from the gyros, are stored in a set of flip-flops. At the beginning of each iteration of the matrix computation, the pulse data is transferred to a second set of flip-flops which are unchanged for the remainder of the cycle, and the first set is cleared.

Figure 3B:
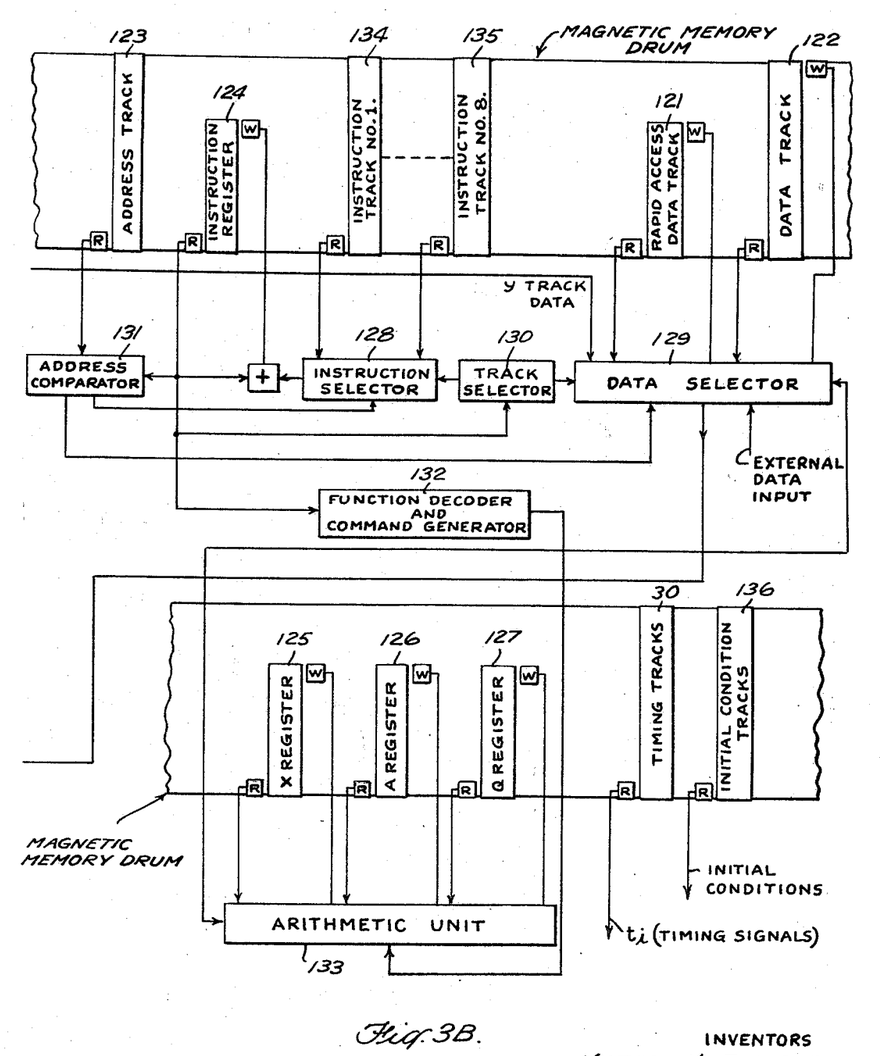

As shown in FIGURES 3, and 3b, the timing signals are obtained from the timing tracks 30 on the magnetic drum and are employed to control gates 32 through 43 of the matrix computer. In addition, gates 32 and 33 are connected to a readout head of $(b_{13})_n$ track 44 of the magnetic memory drum. Gate 33 is connected through an "OR" gate 46 to a second gate 47 in which the direction cosines $(b_{13})_n$ are gated by the quantity $\Delta\theta_y$ placed in subtracter 50. The $(b_{12})_n$ track 51 is also connected to the subtracter 50 through the gate 37, "OR" gate 52, $\Delta\theta_z$ gate 53 and the adder 54. The adder 54 also receives the quantity $(b_{11})_n$ from the track 55 which supplies this direction cosine through gate 42 and "OR" gate 56. The process is repeated three times for all the values $(b'_{i1})_n$ where $i$ equals 1, 2 and 3. The direction cosine $(b'_{12})_n$ is similarly determined in the matrix computer. To that end, the track 44 is connected to the $\Delta\theta_x$ gate 57 through the gate 33 and the "OR" gate 46 and the output of gate 57 is then fed to adder 58 which is also connected to the track 51 through the gate 38 and the "OR" gate 60 to receive the quantity $b_{12}$. The output of the adder is then placed into subtracter 61 to which is fed the direction cosine $b_{11}$ from track 55 gated by the quantity $\Delta\theta_z$ by gate 62 which is connected to gate 41 which receives $b_{11}$ from the track 55 by means of the "OR" gate 64. The write head for the $b_{12}$ track 51 then receives from the subtracter 61 the quantity $(b'_{12})_n$. The quantity $(b'_{13})_n$ is similarly computed. Accordingly, gate 37 receives from track 51 the direction cosine $b_{12}$ and feeds its output through "OR" gate 52. $\Delta\theta_x$ gate 67 in turn places the combined quantity ½$\Delta\theta_x(b_{12})_n$ in subtracter 70. The other input to the subtracter 70 is received from the adder 72 and there is placed in the adder the quantity ½$\Delta\theta_y(b_{11})_n$ by means of track 55 and the connecting elements, gate 41, "OR" gate 64 and $\Delta\theta_y$ gate 73. Also placed in the adder 72 is the readout quantity $b_{13}$ from track 44 which is fed to the adder 72 through gate 34 and "OR" gate 74. The process is repeated three times for $i$ equaling 1, 2 and 3.

The intermediate values of the direction cosines are then used in the same time shared components utilizing gates 32, 35, 36, 39, 40, 43 and the 1 bit delays 45, 65 and 63, to determine the updated values of the direction cosines, the process being also iterative. The equations for determining the updated values are nearly the same as for the intermediate values of the direction cosines and, accordingly, the determinations may be made by the same equipment.

The coordinate converter 22 converts the accelerometer and Doppler outputs from body to inertial coordinates and to that end employs the direction cosines determined in the matrix computer 21. The conversions are effected according to the equations in box 22 in the block diagram of FIG. 2. Accordingly, the conversions of the accelerometer data is implemented as follows. To compute $\Delta V_x$ in the inertial frame, "OR" gate 75 receives the quantity $\Delta V_x$ in the body system from one of the accelerometers in box 12 and places this component in gate 76 which also receives the direction cosine $b_{11}$ which is obtained from the $(b_{11})_n$ track 55, the output of gate 76 $b_{11}\Delta V_x$ being placed in adder 77 through time controlled gate 78 and "OR" gate 80. In addition, $\Delta V_y$ in the body system derived in one of the accelerometers is placed in "OR" gate 81 and gates the direction cosine $b_{12}$, which is obtained from the $(b_{12})_n$ track 51, in gate 82 which places the combined output in adder 83 which is connected to the adder 77 from time controlled gate 90, "OR" gate 91 and "OR" gate 92. The adder 83 also receives the quantity $b_{13}\Delta V_z$ from "OR" gate 84 and gate 85 which is connected to the $(b_{13})_n$ track 44.

The quantity $\Delta V_y$ in the inertial frame is computed as follows. The direction cosine $b_{21}$ is read out of track 55 and is placed in gate 76 which receives the component $\Delta V_x$ from the "OR" gate 75 and places the combined quantity $b_{21}\Delta V_x$ in adder 77. The adder 83 receives as two separate inputs the quantities $b_{22}\Delta V_y$ and $b_{23}\Delta V_z$ from gates 82 and 85, respectively, which in turn receive the direction cosines $b_{22}$ and $b_{23}$ from tracks 51 and 44 respectively, and the components $\Delta V_y$ and $\Delta V_z$ from "OR" gates 81 and 84, respectively. $\Delta V_z$ is similarly computed as follows: The quantity $b_{33}$, which is obtained from the $(b_{13})_n$ track 55, gated by component $\Delta V_x$ in the body system in gate 76, the combined output $b_{33}\Delta V_x$ is placed in the adder 77. The direction cosine $b_{32}$ derived from track 51 is gated by the quantity $\Delta V_y$ in gate 82 and the combined output is placed in adder 83 which also receives from the input of gate 85 the quantity $b_{33}\Delta V_z$ derived from track 44 and "OR" gate 84, respectively. The output of the adder 83 is then placed in adder 77 which receives in time the three velocity increment components in the inertial frame, namely, $\Delta V_x|^I$, $\Delta V_y|^I$ and $\Delta V_z|^I$.

The three Doppler components in the body system represented collectively by the notation $\overline{U}|^B \Delta t$ in FIG. 2 are then separately placed in "OR" gates 81, 75 and 84 and the same process is completed to effect their conversion to incremental components in the inertial frame, according to the equations in FIG. 2.

The $\overline{R}$ computer computes the vector which establishes the position of the vehicle relative to the center of the earth. As indicated in FIGURE 2, the information used in the computation includes the accelerometer and Doppler data expressed in inertial coordinates, altimeter information, feedback information from the $\varpi_e$ filter 26 and feedback of latitude information from the output parameter computer 27. The equations solved in the $\overline{R}$ computer are:

$$\ddot{\overline{R}}|_I + C_1 \dot{\overline{R}}|_I + \omega_s^2 \overline{R} = \overline{A} + C_1(\overline{U} + \overline{\omega}_{e_0} x \overline{R}) \qquad (10)$$

and $$\omega_s^2 = K_0 + K_1 \sin \lambda + K_2 \cos^2 \lambda + K_3 h \qquad (11)$$

where $\overline{R}$ = vehicle position vector $\dot{\overline{R}}|_I, \ddot{\overline{R}}|_I$ = first and second time derivatives, respectively, of $\overline{R}$ referred to inertial space
$C_1$ = damping constant
$K_0, K_1, K_2, K_3$ = constants for $\omega_s$ computation
$\lambda$ = latitude
$h$ = altitude above sea level (from altimeter)
$\omega_s$ = Schuler (radian) frequency $\omega_s^2$ is computed as shown in Equation 11. This Equation 11 also corrects for the nonsphericity of the earth.

The solutions to the difference equations shown in box 23 are derived in the Digital Differential Analyzer (D.D.A.) portion of the $\overline{R}$ computer. The Y track 96 and the R track 95 each contain 60 recirculating registers which, utilizing the proper gates and adders of the drum, provide a capacity for 60 integrators. The D.D.A. integrator utilizes the standard rectangular method of approximating an integration $$Z = \int_0^n Y \, dZ$$

with the summation $$Z = \sum_{i=0}^{n} Y \Delta X$$

The generation of the function (Y) to be integrated is effected by adding $\Delta Y$ increments which are obtained from $\Delta Z$ sign track 115, $\Delta Z$ magnitude track 116, $\Delta Y$ location track 101, location coincidence and logic circuits 102, forward-backward counter 103, shift register 104, gates 105 and 80 and adder 77 to an initial value of Y obtained from Y track 106 and the gates 91 and 92 and storing the sum in a Y register associated with the track 106. The summation of $Y \Delta X$ is accomplished by scaling $\Delta X$ to unity, using $\Delta X$ obtained from $\Delta Z$ sign track 115, $\Delta Z$ magnitude track 116, $\Delta X$ location track 107 and the logic circuit 102 to gate the accumulated Y values through gate 108, and accumulating $Y \Delta X$ in the R track 110. Since $Y \Delta X$ is accumulated in a finite register, overflows will occur. If the remainder in this accumulating register is defined as R and the overflow as $\Delta Z$, then $Z = R + \Sigma \Delta Z$. The register on track 110 containing R is called the R register, and the overflows ($\Delta Z$) from this register are used as inputs (either $\Delta Y$ or $\Delta X$) to other integrators. Since $\Delta Z$ is a measure of the rate of change of Z, the basic equation solved by the integrator is $\Delta Z = Y \Delta X$, approximating the differential term $dZ = Y dX$.

The $\Delta Z$ pulse outputs from the various integrators are stored in a pair of precessing recirculating tracks 115, 116, the former being for sign and the latter being for magnitude, such that a multiplicity of integrator outputs may be stored in one word length. The $\Delta Z$ storage is accomplished as follows: Each integrator is processed, once for each iteration, during a single 24-bit word time. At a fixed bit-time during each word time, the $\Delta Z$ pulse (if any) is stored in the $\Delta Z$ tracks. The $\Delta Z$ track word length is only 23 bits long and this word continuously recirculates between write and read heads on the $\Delta Z$ track. Since there is a one-bit difference in word lengths, the bit position of the $\Delta Z$ word that appears at the $\Delta Z$ writing head at the time a new $\Delta Z$ is to be recorded precesses such that the outputs of 23 successively processed integrators may be recorded in the single $\Delta Z$ word. Thus, the integrator processed has available to it the outputs of the previous 20 integrators. Access to 3-bit positions is lost in order to avoid conflict with timing and switching data which are read out prior to selecting the correct $\Delta Z$ pulses.

The actual D.D.A. operation is as follows: in the word time prior to the processing of a particular integrator, a pair of 24-bit location words is read out from the location tracks 101 and 107, one for $\Delta X$ and one for $\Delta Y$. Each location word includes one bit to select the mode of operation (D.D.A. or coordinate conversion), two bits for switching functions, one bit to assign the sign of the $\Delta Z$ quantity as required by the difference equations, and 20 bits to be used simply as coincidence pulses for the proper $\Delta Z$ selection. Each time a coincidence pulse occurs, the corresponding $\Delta Z$ is read out. Several $\Delta Z$ pulses may be combined to form the $\Delta Y$ input to a particular integrator. Since these may be positive or negative, the forward-backward binary counter 103 is used to count pulses. When all the $\Delta Z$ pulses for the $\Delta Y$ input to an integrator have been counted, the total is dumped in parallel into the $\Delta Y$ shift register 104 so that when the stored Y value of the integrator is serially read out a serial addition of $Y + \Delta Y$ may be effected to form the new Y value. In the case of $\Delta X$, only one $\Delta Z$ pulse is used as an input to a given integrator and it is selected by a coincidence pulse from the $\Delta X$ location track 107. The $\Delta X$ pulse is used directly as a gating pulse to allow the summation of $Y \Delta X$ with the contents of the R register. The logic of the overflow detector 112 is connected to receive the combined $Y \Delta X$ output of gate 108 and the read-out quantity R from track 110, that is, quantities being combined in adder 114. The detector 112 detects any $\Delta Z$ overflow of the R register in terms of sign and magnitude. The $\Delta Z$ sign and magnitude pulses are stored in the $\Delta Z$ tracks 115 and 116, respectively, and the remainder of the addition is stored in the R register of that integrator.

The difference equations are implemented, therefore, using the available integrators with the flow of data directed by the words of the location tracks. The methods of forming the various terms of the difference equations are as follows: Constants are entered as whole numbers directly into the Y registers of the required integrators. The quantities $\omega_s^2$, $\omega_{ex}$, $\omega_{ey}$, and $\omega_{ez}$, computed in the $\omega_s^2$ section of the $\overline{R}$ computer 23 and the $\varpi_e$ computer 24, are periodically updated in the $\overline{R}$ computer by entering the new values, in whole number fashion, directly into the proper Y registers. In order to form terms having a quantity (K) multiplied by an increment of time ($\Delta t$), $\Delta t$ pulses serve as the $\Delta X$ quantity to pulse the integrator having K in its Y register; this gives overflow pulses $\Delta Z = K\Delta t$. In forming quantities having a variable $R_i$ multiplied by a $K\Delta t$ quantity, $K\Delta t$ pulses serve as $\Delta X$ to pulse a Y register which sums increments ($\Delta R_i$) of $R_i$; the result is overflow pulses $\Delta Z = R_i K\Delta t$. To form an expression like the previous one but multiplied by a quantity K' to obtain ($K'R_i K\Delta t$), it is necessary only to pulse the integrator having K' in its Y register with the $R_i K\Delta t$ pulses. In the case of Doppler components, $U_x\Delta t$ pulses are formed by summing the coordinate converted values in an R register and obtaining overflow pulses; the $U_x\Delta t$ overflow pulses are then used as $\Delta X$ pulses to pulse the integrator having $C_1$ in its Y register in order to form $C_1 U_x\Delta t$ pulses. The quantity $U_{x'}$ the pulse rate of $U_x\Delta t$ pulses, is required for the $\varpi_e$ computation in the $\varpi_e$ computer; it is formed simply by counting $U_x\Delta t$ pulses over a fixed interval of time.

The whole number computer 120 is a general purpose type machine which performs all of the remaining computations of the algebraic-integration system. Included are the computations for $\varpi_e$, latitude, longitude, course, and velocity. Using a stored program of instructions and a time-shared arithmetic section, the whole number computer performs all the required computations in about 2 seconds and repeatedly does this.

The instructions for the machine are stored on eight tracks, 120 words each, on the drum. Data storage tracks include a 30 word rapid access recirculating track 121, a 120 word nonrecirculating track 122, and the Y track 106 of the $\overline{R}$ computer. The drum also contains an address track 123 which serves as an angular position reference about the drum, a single word recirculating instruction register 124 used while extracting information from instruction words, from instruction tracks 134 and 135, and three single word recirculating arithmetic registers 125, 126 and 127. Off-drum hardware includes an instruction selector 128, a data selector 129, a track selector 130, an address comparator 131, a function decoder and command generator 132, an arithmetic unit 133 connected to the encoder and generator 132 which contains the supporting logic and adders for the arithmetic section, miscellaneous logic and gating circuitry, and the read heads, write heads, erase heads and amplifiers required for the drum tracks.

Actual operation of the whole number computer is as follows: the instruction register 124 is employed to recirculate the current instruction word. This 24-bit word includes 4 binary bits which specify the function to be performed, 9 bits to specify the address of the operand to be operated upon (2 bits for data track, 7 bits for angular position), and 11 bits to specify the address of the next instruction (4 bits for track, 7 bits for angular position data). While the instruction word recirculates, the 4-bit function word is decoded into the appropriate commands and used to generate the proper gating signals in the arithmetic section. Next, the operand is located and then the search for the next instruction is effected. The 2 bits of the operand track data are interpreted by the track selector 130 in order to direct the logic of the data selector 129 to select the proper one of three possible data tracks. The 7 bits of the operand angular position data are compared with the address track data until equality is obtained; the operand is gated from the selected data track into the arithmetic unit 133 during the word time following equality. The search for the next instruction word is similarly handled with 4 bits used to select the correct one of eight instruction tracks and 7 bits to determine the angular position; upon equality, the next instruction word is gated into the instruction register.

The operand or data word consists of 24 bits including a spacer bit, a sign bit, and 22 bits for the actual number. The data word is processed in the arithmetic section in any one of 16 basic operations as directed by the 4-bit function word previously decoded. These include addition, subtraction, multiplication, division, clear, shift, store, etc.

The arithmetic section includes arithmetic unit 133 and the three single word recirculating drum registers, designated the X, A and Q registers 125, 126 and 127, respectively. The X register 125 is a fixed 24-bit register while each of the others is composed of a 23-bit track length plus 2 bits of switchable flip-flop delay. The A and Q registers 126 and 127, respectively, are thus able to assume a 23, 24 or 25 bit effective length. This facility permits the shifting of either of these registers one bit right or left per word period. The basic operation of the arithmetic section involves the addition of the X register contents to that of the A register with the sum entered into the A register. Subtraction is accomplished using the same registers but on a two's complement basis. Multiplication is effected through repeated additions with the multiplier located in Q and the multiplicand in X. At the conclusion of the multiplication, the most significant portion of the product will appear in A with the least significant portion appearing in Q. In division, a double length word appearing in A and Q, as above is divided by a single length word in X. At the conclusion of the division, the quotient will appear in Q with the remainder available in A.

The shift instruction utilizes the operand address portion of the instruction word to specify the shift count and direction of shift; included are a right and left shift of A and of A and Q together. The latter shift treats the A and Q registers as combined to form a double length register with the Q portion the least significant part. The shift counting process is simply implemented by placing the two's complement of the shift count in the angular address portion of the operand address and to increment the instruction word by one per each circulation. Overflow from the angular address portion would then serve to indicate completion of the shift. The same counting scheme is used also for counting the 24 steps allowed for multiplication and division operations; this requires that, following the obtainment of the operand, the angular address portion be replaced by the two's complement of 24.

The sign jump command is used when a decision is to be made by the computer. The manual jump commands may be used to change the mode of operation. The binary to binary-coded decimal conversion is accomplished on command simply by a series of shifts (by delays), add, and overflow shift operations. Other operations, not included in the basic commands, such as square root and arctan computations, are accomplished by programming the basic commands as required. Subroutines are not used for these operations since a subroutine used in more than one place in the program requires a final step with variable next instruction address, while, for reliability, it is desirable not to have any modification of instruction addresses. Thus, for example, the square root program may be repeated five times during a complete whole number computation cycle; the cost is simply a little more instruction storage space.

Control timing signals, required to support the operation of the whole number computer, are stored on a pre-recorded drum track 30. These signals determine the necessary gating signals while initial condition quantities are stored on tracks 136.

The computations of the x, y and z components of the earth's angular velocity vector are made according to one of the two sets of equations shown in box 24 of FIG. 2. The $\varpi_e$ computer computes in either the magnitude-velocity mode, the velocity-acceleration mode or the $\varpi_e$ memory mode depending upon conditions in the automatic mode selector 25. The selector 25 constantly monitors both position and velocity, and automatically switches the $\varpi_e$ solutions in the computer 24 and hence affects the solutions in the $\varpi_e$ filter 26 so that the optimum $\varpi_e$ computation is achieved under the prevailing conditions. The primary modes of $\varpi_e$ computation are the magnitude-velocity mode and the velocity-acceleration mode, while the $\varpi_e$ memory mode is used to replace the latter under particular velocity conditions. The selector 25 receives latitude $\lambda$ and easterly velocity $V_E$, causing switching between modes to occur according to the following:

In magnitude-velocity mode: switch to velocity-acceleration mode when $\lambda < \lambda_m - \sigma$ In velocity-acceleration mode: switch to $\varpi_e$ memory mode when $\dot{R}_E < V_m - \delta$; switch to magnitude-velocity mode when $\lambda > \lambda_m + \sigma$ In $\varpi_e$ memory mode: switch to velocity-acceleration mode when $\dot{R}_E > V_m + \delta$; switch to magnitude-velocity mode when $\lambda > \lambda_m + \sigma$ where $\dot{R}_E = |V_E + \omega_e R|$ = magnitude of the east component of the velocity with respect to inertial space
$V_m$ = minimum velocity with respect to inertial space for velocity-acceleration mode
$V_E$ = east component of vehicle velocity
$\delta$ = small velocity used to provide a dead band of $2\delta$
$\omega_e R$ = velocity of point on earth surface at the equator, a constant
$\lambda_m$ = lower latitude limit of magnitude-velocity mode
$\sigma$ = small angle used to provide a dead band of $2\sigma$ In the $\varpi_e$ memory mode, the filtered components of $\varpi_e$ are frozen at the most recently computed values, remaining fixed until the mode is again switched.

The $\varpi_e$ filter 26 accepts the computed values of the $x, y$ and $z$ components of $\varpi_e$ and filters them in accordance with the equations shown in box 26 of the block diagram which lend themselves to iterative process of computation. In the equations, zero subscript signifies a filtered quantity, $n+1$, and $n$ subscripts denote the current and previous values, respectively, of the variable components, $\Delta t_W$ is the iterative period of the whole number computer 120 and T is the filter time constant.

The output parameter computer accepts information on $\overline{R}$, $\dot{\overline{R}}|_I$, and $\varpi_{eo}$ from the $\overline{R}$ computer 23 and $\varpi_e$ filter 26 and computes the navigation parameters including position, velocity, and latitude from the equations presented below:

Latitude $$\lambda = \text{arc sin} \frac{\bar{\omega}_{eo} \cdot \overline{R}}{\omega_{oo} R}$$

Longitude $$\phi = \int^t \bar{\mu} \cdot \frac{\bar{\omega}_{eo} \times \overline{R}}{|\bar{\omega}_{eo} \times \overline{R}|} dt + \phi_0$$

where $$\bar{\mu} = \overline{U}|_I$$

(when Doppler data is available)

$$\bar{\mu} = \dot{\overline{R}}|_I - \bar{\omega}_{eo} \times \overline{R}$$

(when Doppler data is not available)

Velocity:

$$V_N = \bar{\mu} \cdot \frac{\bar{\omega}_{eh}}{|\bar{\omega}_{eh}|}$$

$$V_E = \bar{\mu} \cdot \frac{\bar{\omega}_{eo} \times \overline{R}}{|\bar{\omega}_{eo} \times \overline{R}|}$$

where $V_N$ = north component of velocity
$V_E$ = east component of velocity $$\bar{\omega}_{eh} = \hat{R} \times (\bar{\omega}_{eo} \times \hat{R})$$

(the horizontal component of $\bar{\omega}_{eo}$)

Course:

$$\psi = \text{arc tan} \frac{V_E}{V_N}$$

(for $V_E \leq V_N$)

$$\psi = \frac{\pi}{2} - \text{arc tan} \frac{V_N}{V_E}$$

(for $V_E > V_N$)

$\psi$ = Course (direction with respect to north, of the vehicle's velocity with respect to earth)

Attitude: The vehicle's attitude is determined from a knowledge of the vectors $\overline{R}$ and $\bar{\omega}_{eo}$ relative to the body frame. However, the actual attitude angles are not computed since it is usually sufficient to make these vectors available for reference within the computer.

Various modifications of the inertial navigation system as described above may be effected by persons skilled in the art without departing from the principle and scope of the invention as defined in the appended claims.

What is claimed is:

1. An inertial navigation system having as sensors an altimeter, orthogonally arranged gyros and accelerometers and a radar Doppler, means connected to said gyros for determining direction cosines for converting the velocity and displacement incremental outputs of the accelerometers and Doppler, respectively, from the body to inertial frame, a coordinate converter connected to the direction cosine determining means, a means for computing $\omega_s^2$ connected to said altimeter, an $\overline{R}$ position determining computer arranged to receive the output of the coordinate converter and $\omega_s^2$ computing means and a whole number computer for determining course, velocity and longitude and latitude position connected to said $\overline{R}$ position determining computer, wherein $\omega_s$ is Schuler frequency and R is a vector quantity representing distance to the center of the earth.

2. An inertial navigation system having as sensors an altimeter, orthogonally arranged gyros and accelerometers and a radar Doppler, a matrix computer connected to gyros and adapted to determine direction cosines which are used to convert the velocity and displacement incremental outputs from the accelerometers and the radar Doppler to inertial frames, a coordinate converter connected to the direction cosines determining means, a means for computing $\omega_s^2$ connected to said altimeter, and $\overline{R}$ position determining computer arranged to receive the output of the coordinate converter and $\omega_s^2$ computing means and a whole number computer for determining course, velocity and longitude and latitude position connected to said $\overline{R}$ position determining computer, wherein $\omega_s$ is Schuler frequency and $\overline{R}$ is a vector quantity representing distance to the center of the earth.

3. An inertial navigation system having as sensors an altimeter, orthogonally arranged gyros and accelerometers and a radar Doppler, a matrix computer connected to gyros and adapted to determine direction cosines which are used to convert the velocity and displacement incremental outputs from the accelerometers and the radar Doppler to inertial frames, said matrix computer having means for intermediate and updated values of the direction cosines, a coordinate converter connected to the direction cosine determining means, a means for computing $\omega_s^2$ connected to said altimeter and $\overline{R}$ position determining computer arranged to receive the output of the coordinate converter and $\omega_s^2$ computing means and a whole number computer for determining course, velocity and longitude and latitude position connected to said $\overline{R}$ position determining computer, wherein $\omega_s$ is Schuler frequency and $\overline{R}$ is a vector quantity representing distance to the center of the earth.

4. An inertial navigation system having as sensors an altimeter, orthogonally arranged gyros and accelerometers and a radar Doppler, a matrix computer connected to gyros and adapted to determine direction cosines which are used to convert the velocity and displacement incremental outputs from the accelerometers and the radar Doppler to inertial frames, said matrix computer having means for intermediate and updated values of the direction cosines, the computation for the intermediate values being implemented according to the following equations:

$$[b'_{11}](n) = [b_{11}](n) + \frac{1}{2}\{\Delta\theta_z[b_{12}](n) - \Delta\theta_y[b_{13}](n)\}$$
$$[b'_{12}](n) = [b_{12}](n) + \frac{1}{2}\{\Delta\theta_x[b_{13}](n) - \Delta\theta_z[b_{11}](n)\}$$
$$[b'_{13}](n) = [b_{13}](n) + \frac{1}{2}\{\Delta\theta_y[b_{11}](n) - \Delta\theta_x[b_{12}](n)\}$$

and the computation for the updated values being implemented according to the following equations:

$$[b_{11}](n+1) = [b_{11}](n) + \Delta\theta_z[b'_{12}](n) - \Delta\theta_y[b'_{13}](n)$$
$$[b_{12}](n+1) = [b_{12}](n) + \Delta\theta_x[b'_{13}](n) - \Delta\theta_z[b'_{11}](n)$$
$$[b_{13}](n+1) = [b_{13}](n) + \Delta\theta_y[b'_{11}](n) - \Delta\theta_x[b'_{12}](n)$$

where $i$ equals 1, 2 and 3, wherein $b'_{i1}$, $b'_{i2}$ and $b'_{i3}$ are intermediate values of direction cosines between the body frame and the inertial frame and $b_{i1}$, $b_{i2}$ and $b_{i3}$ are updated values thereof, $\Delta\theta_x$, $\Delta\theta_y$ and $\Delta\theta_z$ are the angular increments in the body frame measured by the rate integral gyros and the components for determining the intermediate and updated values of the direction cosines are time shared, a coordinate converter connected to the direction cosine determining means, a means for computing $\omega_s^2$ connected to said altimeter, and $\overline{R}$ position determining computer arranged to receive the output of the coordinate converter and $\omega_s^2$ computing means and a whole number computer for determining course, velocity and longitude and latitude position connected to said $\overline{R}$ position determining computer wherein $\omega_s$ is Schuler frequency and $\overline{R}$ is a vector quantity representing distance to the center of the earth.

5. An inertial navigation system having as sensors an altimeter, orthogonally arranged gyros and accelerometers and a radar Doppler, means connected to said gyros for determining direction cosines, a coordinate converter connected to the direction cosine determining means for converting the velocity and displacement incremental outputs of the accelerometers and Doppler, respectively, from the body to inertial frame, a means for computing $\omega_s^2$ connected to said altimeter, and $\overline{R}$ position determining computer arranged to receive the output of the coordinate converter and $\omega_s^2$ computing means wherein $\omega_s$ is Schuler frequency and $\overline{R}$ is a vector quantity representing distance to the center of the earth.

6. An inertial navigation system as defined in claim 5 wherein said coordinate converter converts the velocity and displacement increments from the body to inertial frames in accordance with the following equations:

$$\Delta V_x|^I = b_{11}\Delta V_x|^B + b_{12}\Delta V_y|^B + b_{13}\Delta V_z|^B$$
$$\Delta V_y|^I = b_{21}\Delta V_x|^B + b_{22}\Delta V_y|^B + b_{23}\Delta V_z|^B$$
$$\Delta V_z|^I = b_{31}\Delta V_x|^B + b_{32}\Delta V_y|^B + b_{33}\Delta V_z|^B$$
$$U_x|^I\Delta t = b_{11}U_x|^B\Delta t + b_{12}U_y|^B\Delta t + b_{13}U_z|^B\Delta t$$
$$U_y|^I\Delta t = b_{21}U_x|^B\Delta t + b_{22}U_y|^B\Delta t + b_{23}U_z|^B\Delta t$$
$$U_z|^I\Delta t = b_{31}U_x|^B\Delta t + b_{32}U_y|^B\Delta t + b_{33}U_z|^B\Delta t$$

wherein $b_{11} \ldots b_{33}$ are direction cosines $\Delta V_x|^I, \Delta V_y|^I$ and $\Delta V_z|^I$ are velocity increment components in inertial frame, $\Delta V_x|^B, \Delta V_y|^B$ and $\Delta V_z|^B$ are velocity increment components in the body frame, $U_x|^I\Delta t, U_y|^I\Delta t$ and $U_z|^I\Delta t$ are displacement increment components in the inertial frame, and $U_x|^B\Delta t, U_y|^B\Delta t$ and $U_z|^B\Delta t$ are displacement increment components in the body frame.

7. An inertial navigation system having as sensors an altimeter, orthogonally arranged gyros and accelerometers and a radar Doppler, means connected to said gyros for determining direction cosines for converting the velocity and displacement incremental outputs of the accelerometers and Doppler, respectively, from the body to inertial frame, a coordinate converter connected to the direction cosine determining means, a means for computing $\omega_s^2$ connected to said altimeter, an $\overline{R}$ position determining computer arranged to receive the output of the coordinate converter and $\omega_s^2$ computing means and a whole number computer for determining course, velocity and longitude and latitude position connected to said $\overline{R}$ position determining computer, said whole number computer having a means for determining $x$, $y$ and $z$ components of the earth's angular velocity vector $\overline{\omega}_e$, $\overline{\omega}_e$ filter means connected to the latter means and an output navigation parameter computer connected to said filtering means and to said $\overline{R}$ position determining computer, wherein $\omega_s$ is Schuler frequency and $\overline{R}$ is a vector quantity representing distance to the center of the earth.

8. An inertial navigation system as claimed in claim 7 wherein said means for determining the $x$, $y$ and $z$ components of the earth's angular velocity vector $\overline{\omega}_e$ include means for alternatively determining said components in the magnitude-velocity mode or the velocity-acceleration mode or the memory mode and there is provided an automatic mode selector connected to the output navigation parameter computer for controlling the mode of computation in the said $x$, $y$ and $z$ earth's angular velocity component determining means.

References Cited

UNITED STATES PATENTS

| | | | |
|---|---|---|---|
| 2,914,763 | 11/1959 | Greenwood et al. | 343—9 |
| 3,028,592 | 4/1962 | Parr et al. | 343—7 |
| 2,953,303 | 10/1960 | Sedgfield | 235—187 |
| 2,996,268 | 8/1961 | Brown et al. | 235—151 |
| 3,021,068 | 2/1962 | Ostroff | 235—187 |
| 3,087,333 | 4/1963 | Newell | 235—151 |
| 3,103,579 | 10/1963 | Green | 235—187 |

MARTIN P. HARTMAN, *Primary Examiner.*

LEWIS H. MYERS, *Assistant Examiner.*